US012612026B2

(12) United States Patent
Bensch et al.

(10) Patent No.: US 12,612,026 B2
(45) Date of Patent: Apr. 28, 2026

(54) METHOD FOR ASCERTAINING A CONTINUOUS BRAKING POWER, COMPUTER PROGRAM AND/OR COMPUTER-READABLE MEDIUM, CONTROLLER AND VEHICLE, IN PARTICULAR COMMERCIAL VEHICLE

(71) Applicants:ZF CV Systems Global GmbH, Bern (CH); ZF Friedrichshafen AG, Friedrichshafen (DE)

(72) Inventors: Uwe Bensch, Hannover (DE); Winfried Fakler, Eriskirch (DE); Johannes Heseding, Hannover (DE); Thomas Kattenberg, Vechelde (DE)

(73) Assignees: ZF CV Systems Global GmbH, Bern (CH); ZF Friedrichshafen AG, Friedrichshafen (DE)

( * ) Notice: Subject to any disclaimer, the term of this patent is extended or adjusted under 35 U.S.C. 154(b) by 3 days.

(21) Appl. No.: 18/952,712

(22) Filed: Nov. 19, 2024

(65) Prior Publication Data

US 2025/0074386 A1      Mar. 6, 2025

Related U.S. Application Data

(63) Continuation of application No. PCT/EP2023/055287, filed on Mar. 2, 2023.

(30) Foreign Application Priority Data

May 19, 2022      (DE) ..................... 10 2022 112 608.0

(51) Int. Cl.
B60T 17/22          (2006.01)
B60T 8/171          (2006.01)
B60T 8/172          (2006.01)

(52) U.S. Cl.
CPC .............. B60T 17/22 (2013.01); B60T 8/171 (2013.01); B60T 8/172 (2013.01);
(Continued)

(58) Field of Classification Search
CPC .......... B60T 17/22; B60T 8/171; B60T 8/172; B60T 2201/04; B60T 2250/04;
(Continued)

(56) References Cited

U.S. PATENT DOCUMENTS

2006/0131950 A1      6/2006  Larson
2016/0138665 A1      5/2016  Antanaitis et al.
(Continued)

FOREIGN PATENT DOCUMENTS

WO          2017/050885 A1      3/2017
WO          2020/127210 A1      6/2020

OTHER PUBLICATIONS

International Search Report of the European Patent Office dated May 23, 2023 for international application PCT/EP2023/055287 on which this application is based.
(Continued)

*Primary Examiner* — Yi-Kai Wang
(74) *Attorney, Agent, or Firm* — Walter Ottesen, P.A.

(57)          ABSTRACT

A method for determining a continuous braking power for a vehicle, in particular a commercial vehicle, the method having the steps: determining an ambient temperature; determining a speed, wherein the speed is representative of the speed of the vehicle, in particular the commercial vehicle; determining a thermal emission per unit time of a friction braking device on the basis of the ambient temperature and the speed; and determining the continuous braking power of the friction braking device on the basis of the thermal emission per unit time.

18 Claims, 2 Drawing Sheets

(52) U.S. Cl.
CPC ....... *B60T 2201/04* (2013.01); *B60T 2250/04* (2013.01); *B60T 2270/60* (2013.01); *B60T 2270/608* (2013.01)

(58) Field of Classification Search
CPC .......... B60T 2270/60; B60T 2270/608; B60T 2270/604; B60T 8/1806; B60T 8/245; B60T 8/3215; B60T 10/00; B60T 8/1725
USPC ......................................................... 701/70
See application file for complete search history.

(56)                  References Cited

U.S. PATENT DOCUMENTS

| | | | |
|---|---|---|---|
| 2019/0071062 A1* | 3/2019 | Robere | .................... B60L 3/12 |
| 2022/0073039 A1 | 3/2022 | Putz | |
| 2023/0140171 A1* | 5/2023 | Yokoyama | ............. B60T 17/22 |
| | | | 701/32.3 |

OTHER PUBLICATIONS

Norm ECE-R 13-H 2004, Vehicle Regulations (Braking), Economic Commission for Europe, Sep. 2004, Informal Document No. GRRF-56-2, pp. 1 to 36.
English translation and Written Opinion of the International Searching Authority dated May 23, 2023 for international application PCT/EP2023/055287 on which this application is based.

* cited by examiner

1

METHOD FOR ASCERTAINING A CONTINUOUS BRAKING POWER, COMPUTER PROGRAM AND/OR COMPUTER-READABLE MEDIUM, CONTROLLER AND VEHICLE, IN PARTICULAR COMMERCIAL VEHICLE

CROSS-REFERENCE TO RELATED APPLICATIONS

This application is a continuation application of international patent application PCT/EP2023/055287, filed Mar. 2, 2023, designating the United States and claiming priority from German application 10 2022 112 608.0, filed May 19, 2022, and the entire content of both applications is incorporated herein by reference.

TECHNICAL FIELD

The disclosure relates to a method for determining a continuous braking power for a vehicle, in particular a commercial vehicle. The disclosure also relates to a computer program and/or a computer-readable medium, a controller for a vehicle, in particular a commercial vehicle, and a vehicle, in particular a commercial vehicle.

BACKGROUND

For vehicle-wide deceleration control and brake control as well as for a suitable selection and control of a deceleration device or braking device, the information about the braking power that the deceleration device can provide on a continuous basis is relevant. The continuous braking power of a vehicle is important, for example, when driving downhill. Especially in commercial vehicles, such as trucks, buses and/or trailers, with an electronically controlled pneumatic braking system (EBS) and/or with an electric traction drive that is set up for regenerative braking, the continuous braking power depends on various factors. In commercial vehicles, the deceleration device contains, in particular, a friction braking device, a continuous braking device (retarder) and/or an electric traction drive (eDrive) set up for regenerative braking, also referred to below as a regenerative braking device.

For the continuous braking device and for the regenerative braking device, information regarding the continuous braking power is available and can be made available by the vehicle, for example via a CAN bus. The friction braking device does not provide any corresponding information.

Conventional continuous braking devices send the available braking torque on the CAN bus, for example by means of an RC and/or ERC1 message according to SAE J1939. If a vehicle cooling system is correctly configured and an engaged gear is selected accordingly, the braking torque or braking power corresponds to the continuous braking power that can be generated by the continuous braking device.

Electric drives also provide information regarding the continuously available braking torque and/or the continuously available braking power. The electric drive is used as a regenerative braking device. In recuperation mode, the braking torque of the regenerative braking device results from the maximum energy absorption capacity of energy storage devices of the vehicle, an operating point-dependent power, that is, a torque, of the electric drive and an inverter, on temperatures of the aforementioned components and possibly other parameters.

With regard to the friction braking device, a temperature model is calculated that determines the temperature of the brake discs and/or brake pads as a function of the applied ("braked") energy and the estimated energy delivered. This information is used to generate alerts when certain temperature limits are exceeded. For example, WO 2017/050885 A1 discloses a method for checking a vehicle brake. A brake has a brake cooling system with a lubricant. The maximum braking power of the brake is determined depending on the thermal dissipation capacity of the brake cooling system.

In the absence of information about the continuous braking power of the friction braking device, the continuous braking power of the vehicle cannot be determined or predicted.

SUMMARY

It is an object of the disclosure to enable the continuous braking power of a vehicle to be determined reliably and effectively.

The object is, for example, achieved by a method for determining a continuous braking power for a vehicle, in particular a commercial vehicle. The method has the following steps: determining an ambient temperature; determining a speed, wherein the speed is representative of the speed of the vehicle, especially a commercial vehicle; determining a thermal emission per unit time of a friction braking device based on the ambient temperature and the speed; and determining the continuous braking power of the friction braking device based on the thermal emission per unit time.

It is proposed to determine a continuous braking power that can be generated for continuous braking of the vehicle in order to be able to provide the continuous braking power within the deceleration system and a controller external to the deceleration system. It was discovered that the braking power that can be generated continuously, that is, the continuous braking power, of the friction braking device, corresponds to the thermal emission or the thermal emission per time unit, since energy, especially potential energy, is converted into heat by braking. It was recognized that the thermal emission per unit time is dependent on the ambient temperature and the speed of the vehicle, as the speed and the ambient temperature are crucial for the transport of heat into an environment of the motor vehicle. The thermal emission thus corresponds to the heat emitted by the friction braking device, which is determined according to the method. The continuous braking power is therefore the braking power that is possible in a steady state taking into account the thermal aspects of the friction braking device.

Information about the continuous braking power of the friction braking device is particularly relevant for vehicles with an electric drive, as this enables a better estimation of the continuous braking power of the combination of the regenerative braking device, the continuous braking device and/or the friction braking device. The continuous braking power of the friction braking device is particularly important against the background of a limited energy absorption capacity of an energy storage unit that is charged by regenerative braking and thus the limited ability of the electric drive for recuperation or for regenerative braking. Thus, in the event of a need for long-term and/or continuous deceleration power with full energy storage, an energy and/or vehicle management system can use the information about the available continuous braking power of the braking devices that are capable of braking, for example for downhill driving and/or for the Type II-A test in accordance with Regulation No. 13 of the United Nations Economic Commission for Europe (UNECE)—Uniform Regulations for the Type Approval of Vehicles of classes M, N, and O with regard to brakes [2016/194]' (ECE R 13).

According to various embodiments, determining the thermal emission is carried out taking into account a physical model for heat transport. The physical model of the heat transport is a computer-aided model that can be evaluated and takes into account as input the energy converted into thermal energy by braking as heat input or thermal emission as well as the ambient temperature and the speed as variables for heat output or thermal emission from the friction braking device into the environment of the friction braking device. The physical model for heat transport preferably includes heat transport by convection, since convection in particular is dependent on the speed of the vehicle, wherein the speed of the vehicle is related to the supply of air cooling the friction braking device with the ambient temperature. According to various embodiments, the physical model for the heat transport includes heat radiation and/or heat conduction as an alternative or addition. Geometric data related to the friction braking device, a thermal capacity and/or a thermal conductivity of the friction braking device and adjacent vehicle components can be taken into account as input into the physical model.

According to various embodiments, the method also includes the step: outputting the continuous braking power of the friction braking device. Outputting the continuous braking power may include outputting to an on-board controller to improve the energy, drive, and/or brake management of the vehicle. Alternatively or additionally, outputting the continuous braking power may include an output perceptible by a user of the vehicle by means of an on-board output device to inform the user of the vehicle.

According to various embodiments, the method also has the following step: determining a total continuous braking power based on the continuous braking power of the friction braking device and a continuous braking power of a continuous braking device and/or a continuous braking power of a regenerative braking device. This allows the total continuous braking power to be determined, taking into account the continuous braking power of the friction braking device. For example, the total continuous braking power can be obtained as an optionally weighted sum of the continuous braking power of the friction braking device and the continuous braking power of the continuous braking device and/or the regenerative braking device. Prioritization can be included in a weighting of the summands. For example, the continuous braking power of the regenerative braking device can be weighted higher if regenerative braking is possible. Alternatively or additionally, the continuous braking power of the regenerative braking device can be weighted less if regenerative braking is limited and/or not possible due to a state of charge of an energy storage device.

According to various embodiments, the thermal emission per unit time is determined while taking into account a temperature threshold. This allows an advantageous operating point of the friction braking device in terms of temperature to be taken into account. Alternatively or additionally, the thermal emission per unit time is determined taking into account a wear indicator. The wear indicator is a parameter that characterizes the condition of the brake pads and/or the brake disc in terms of wear and/or previous use of the friction braking device. With this excessive stress on the friction braking device can be avoided.

According to various embodiments, the temperature threshold is an upper limit of a temperature of the friction braking device. When braking continuously, the temperature can rise to a steady, that is, continuous, temperature. The temperature threshold can be chosen in such a way that at a temperature above the temperature threshold, fading and/or increased wear of the friction braking device occurs. The thermal emission per unit time can be determined in such a way that a steady temperature is set below the temperature threshold in order to avoid fading and/or increased wear. The temperature threshold can be the maximum permissible temperature that must be maintained at a steady level. This means that the temperature threshold has a direct effect on the continuous braking power of the friction braking device.

According to various embodiments, the temperature threshold can be changed during the operation of the vehicle, especially the commercial vehicle. The temperature threshold can be variable in order to be able to call up additional braking with an increased braking power above the continuous braking power, starting from continuous braking. The need for the increased braking power can change during the operation of the vehicle and the temperature threshold can be adjusted accordingly.

According to various embodiments, the temperature threshold depends on the mass of the vehicle, especially the commercial vehicle, and/or on a predetermined scenario. The steady temperature limit can be determined in such a way that, with a known vehicle mass, a certain number of decelerations, for example braking one or more times from a predetermined speed of for example 80 km/h to a standstill of the vehicle with a further increase in temperature, are still possible without exceeding a higher and/or critical temperature, for example to avoid fading and/or increased wear. The mass of the vehicle is proportional to the kinetic and potential energy of the vehicle and thus to the conversion of energy into heat. Therefore, the mass has an effect on the continuous braking power and the temperature threshold. The mass of the vehicle can be changed, for example, by loading the vehicle, which can be taken into account via the changed temperature threshold.

According to various embodiments, the method also includes the following steps: determining and outputting a deceleration depending on the continuous braking power of the friction braking device. Alternatively or additionally, the method also has the following steps: determining and outputting a continuously generatable braking torque depending on the continuous braking power of the friction braking device. In other words, the possible continuous braking power at a known driving speed can be converted into a thermally suitable and correspondingly continuously possible braking torque. The conversion into a steady permissible deceleration is also possible if the mass is known. The continuously possible braking torque and/or the steady permissible deceleration can be communicated for output to a user and/or a controller of the vehicle. Outputting the deceleration may include an output to an on-board controller and/or an output of the deceleration perceptible by a user of the vehicle by means of an on-board output device. The continuously generated braking torque is particularly advantageous for a commercial vehicle, as communication via a fieldbus, such as the CAN-BUS, is typically torque-based. Torque-based communication via the fieldbus concerns, for example, a continuous brake and/or a drive, especially an internal combustion engine such as a diesel engine and/or the electric drive.

According to various embodiments, the method also includes the following steps: determining a target speed based on the continuous braking power and a predetermined down gradient; and outputting the target speed. The target speed is a steady speed. The possible continuous braking power can be converted into the steady speed for a known down gradient, on which the vehicle can theoretically drive downhill for an infinitely long time without overheating the friction braking device. This speed can be communicated to a user and/or a controller such as an autonomous driving computer, which allows safe operation to be maintained even when the energy storage is full. Outputting the target speed may include outputting to an on-board controller and/or an output perceptible by user of the target speed of the vehicle by means of an on-board output device.

According to various embodiments, the target speed is determined taking into account a continuous braking power of a continuous braking device and/or a continuous braking power of a regenerative braking device. In addition, an electric drive can provide further braking power, for example by deliberately increasing energy consumption ("energy destruction"), for example by operating at an unfavorable operating point, which can also be included in the determination of the target speed. Alternatively or additionally, energy management can also be taken into account by operating auxiliary consumers such as a compressor, a cooling system and/or an air conditioning system. Thus a comprehensive determination of the target speed is possible.

According to an aspect of the disclosure, a computer program and/or a computer-readable medium is provided. The computer program and/or the computer-readable medium contain commands which, when the program or commands is/are executed by a computer, cause the computer to carry out the steps of the method according to the disclosure and/or the steps thereof. Optionally, the computer program and/or the computer-readable medium contain commands which, when the program or commands is/are executed by a computer, cause the computer to carry out the steps of the method that are described as advantageous or optional in order to achieve a related technical effect.

According to an aspect of the disclosure, a controller is provided for a vehicle, in particular a commercial vehicle. The controller is set up to carry out the method according to the disclosure. Optionally, the controller is set up to carry out the steps of the method that are described as advantageous or optional in order to achieve a related technical effect.

According to an aspect of the disclosure, a vehicle, in particular a commercial vehicle, is provided with a controller according to the disclosure. Optionally, the controller of the vehicle and/or the vehicle is set up to carry out the steps of the method that are described as advantageous or optional in order to achieve a related technical effect.

BRIEF DESCRIPTION OF DRAWINGS

The invention will now be described with reference to the drawings wherein.

DETAILED DESCRIPTION

Figure 1:
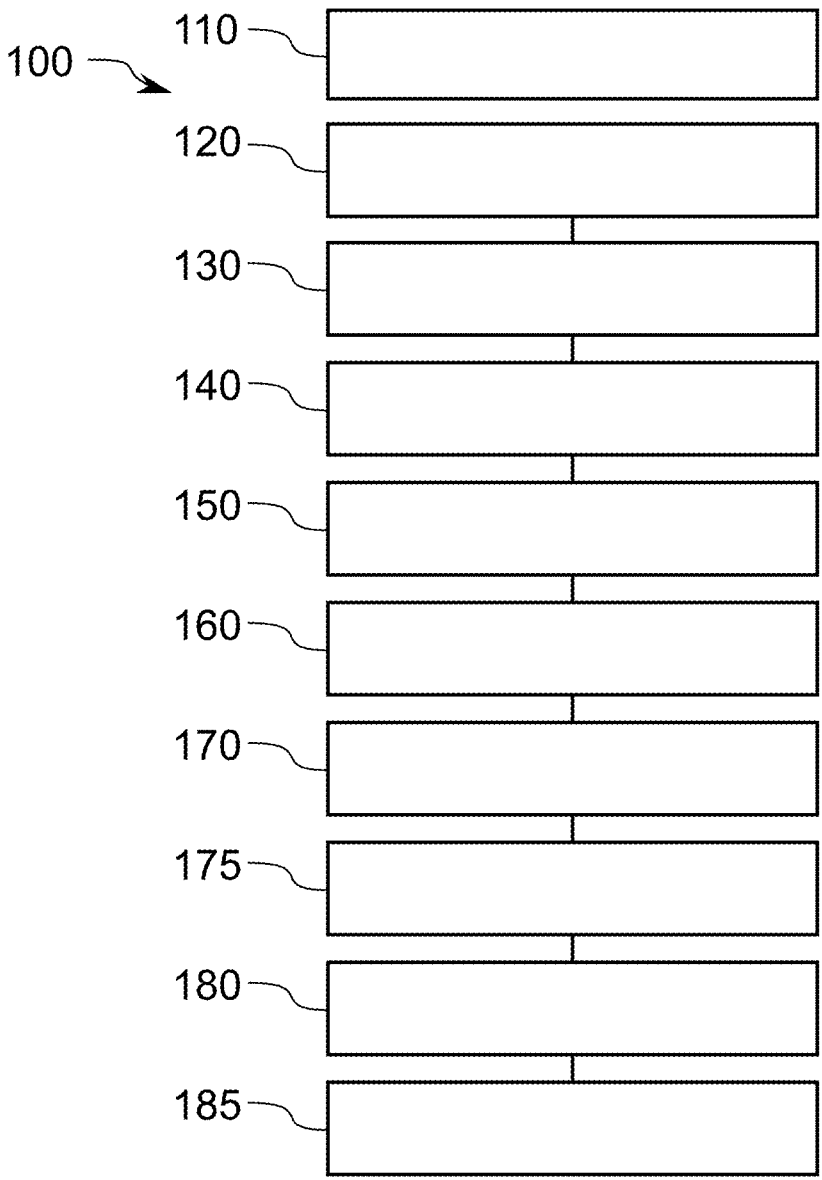
FIG. 1 shows a schematic representation of a flow diagram of a method according to an embodiment of the disclosure; and, FIG. 2 shows a schematic representation of an overview of a vehicle, in particular a commercial vehicle, according to an embodiment of the disclosure.

FIG. 1 shows a schematic representation of a flow diagram of a method 100 according to an embodiment of the disclosure. In particular, FIG. 1 shows a method 100 for determining a continuous braking power P for a vehicle 300a, in particular a commercial vehicle 300b. The vehicle 300a, in particular the commercial vehicle 300b, is hereinafter referred to as the vehicle 300a, 300b. The vehicle 300a, 300b is described in more detail with reference to FIG. 2.

In FIG. 1 the method 100 for the vehicle 300a, 300b begins with a determination 110 of an ambient temperature TS. The ambient temperature TS can be determined 110 by means of an on-board temperature sensor and/or information relating to ambient temperature TS can be received from an on-board communication interface. The ambient temperature TS is a temperature prevailing in an environment 310 of the vehicle 300a, 300b.

A speed V is determined 120. The speed V is representative of the speed V of the vehicle 300a, 300b. The speed V can be determined by an on-board speedometer and/or supported by a tracking system, such as GPS.

This is followed by a determination 130 of a thermal emission HE per time unit t of a friction braking device 200 on the basis of the ambient temperature TS and the speed V. The thermal emission HE per time unit t is determined 130 by an on-board controller 250. The time unit t is arbitrary and can be, for example, seconds, minutes, hours and/or a fraction or a multiple thereof.

The determination 130 of the thermal emission HE is carried out taking into account a physical model M for heat transport K. The physical model M is stored in a memory of the controller 250 and a calculation according to the physical model M can be carried out by a data processing device of the controller.

Inputs to the physical model M are the ambient temperature TS and the speed V. The speed V provides information about the kinetic energy of the vehicle 300a, 300b to be converted into heat by braking. Thermal emission by convection, which is taken into account by the model, is dependent on the speed V. The transport of heat by the transport of heated air from the friction braking device 200 to the environment 310 takes place by convection. The heated air and thus the heat can be emitted into the environment 310 by the friction braking device 200 depending on the speed V.

The determination 130 of the thermal emission HE per time unit t is carried out taking into account a temperature threshold TT and a wear indicator VI. The temperature threshold TT is an upper limit of a temperature TB of the friction braking device 200. The temperature threshold TT is defined by an operating point of the friction braking device 200. The wear indicator VI is defined by the use and/or previous use of the friction braking device 200.

The temperature threshold TT can be changed during the operation of the vehicle 300a, 300b, in order to be able to be adaptively tracked during operation. The temperature threshold TT depends on the mass W of the vehicle 300a, 300b, which is variable with the load of the vehicle 300a, 300b. The temperature threshold TT is dependent on a predetermined scenario, which is for example dependent on the current position of the vehicle 300a, 300b. Here possible energy that can be converted into heat by driving downhill, including potential energy, is taken into account. Alternatively, the temperature threshold TT can be fixed or configured.

This is followed by determining 140 the continuous braking power P of the friction braking device 200 on the basis of the thermal emission HE per time unit t. Here the thermal emission HE per time unit t is converted into the continuous braking power P or a braking torque. By means of continuous braking with the friction braking device 200, a certain amount of heat per time unit t is generated by the friction braking device 200, which is equal to the thermal emission HE per time unit t for a steady temperature TB of the friction braking device 200.

Outputting 150 the continuous braking power P of the friction braking device 200 follows. The outputting 150 is carried out for the information of a user of the vehicle 300a, 300b and/or via a vehicle bus, for example a CAN bus, to an energy, drive and/or brake management system of the vehicle 300a, 300b.

Determination 160 of a total continuous braking power PT is carried out on the basis of the continuous braking power P of the friction braking device 200 and a continuous braking power PR of a continuous braking device 260 and a continuous braking power PN of a regenerative braking device 270. For this purpose, the continuous braking power PR of the continuous braking device 260 and the continuous braking power PN of the regenerative braking device 270 are information that can be retrieved via the vehicle bus, for example.

Determination 170 of a deceleration and a permanently generatable braking torque D is carried out depending on the continuous braking power P of the friction braking device 200 and the deceleration A and the braking torque D are output 175. For this purpose, the continuous braking power P and/or the total continuous braking power PT are converted into the braking torque D, taking into account the speed of a wheel. The braking torque D can be converted into the deceleration A by using the mass W. The outputting 175 is carried out for the information of a user of the vehicle 300a, 300b and/or via a vehicle bus, for example a CAN bus, to an energy, drive and/or brake management system of the vehicle 300a, 300b.

Determination 180 of a target speed VS is carried out on the basis of the continuous braking power P and a predetermined down gradient of 315 and the target speed VS is output 185. The target speed VS is determined taking into account a continuous braking power PR of a continuous braking device 260 and a continuous braking power PN of a regenerative braking device 270. A steady speed can be set by continuous braking. The target speed VS is a targeted steady speed. The outputting 185 is carried out for the information of a user of the vehicle 300a, 300b and/or via a vehicle bus, for example a CAN bus, to an energy, drive and/or brake management system of the vehicle 300a, 300b.

The skilled person recognizes that the sequence of the specified steps of the method 100 is not limited to the sequence shown in FIG. 1. Determining 110 the ambient temperature TS and determining 120 the speed V can be carried out in any order and/or continuously. Determining 170 the deceleration A and outputting 175 the deceleration A is and detecting 180 the target speed VS and outputting 185 the target speed VS are interchangeable and/or can be carried out simultaneously.

Figure 2:
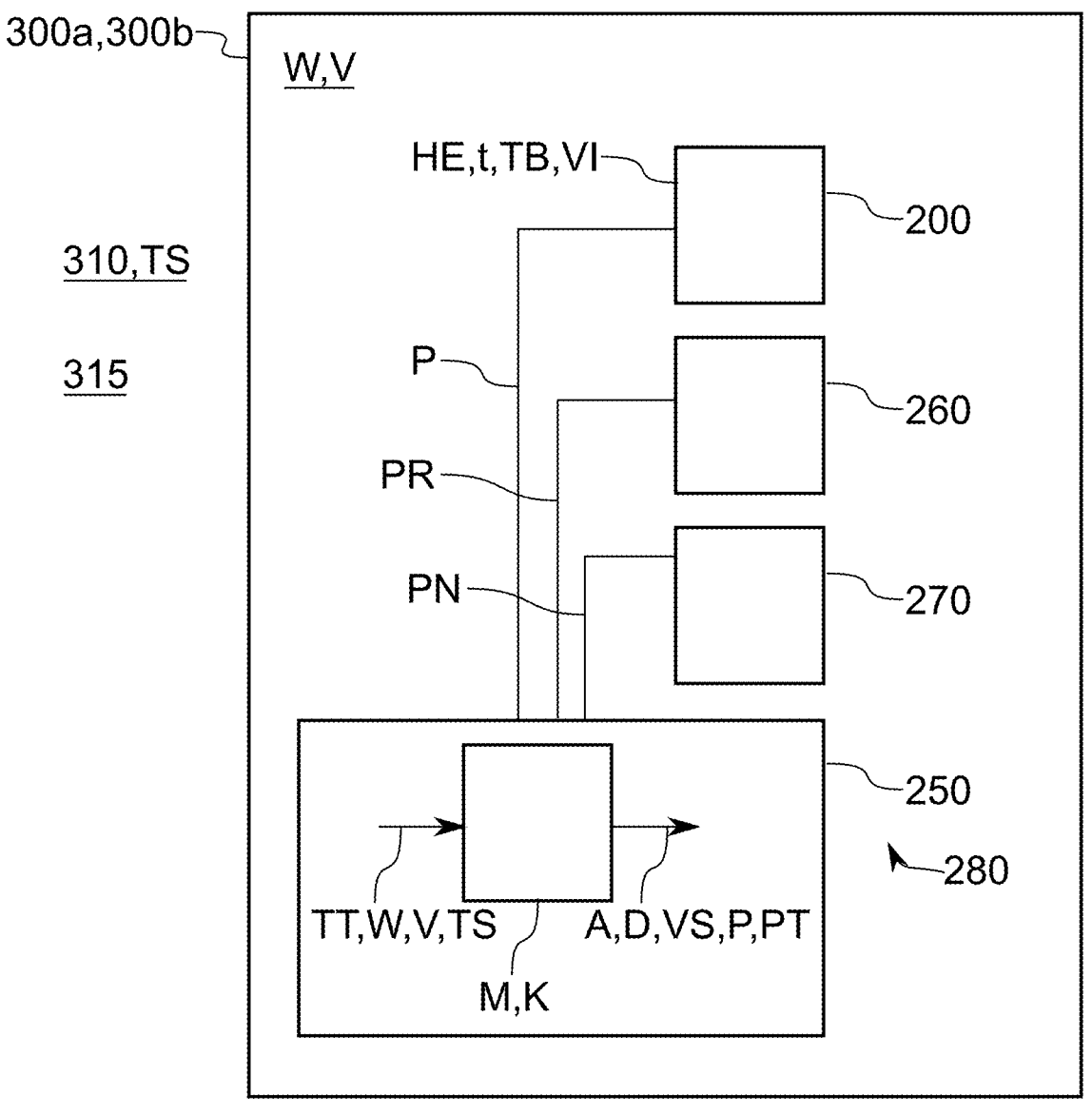

FIG. 2 shows a schematic representation of an overview of a vehicle 300a, in particular a commercial vehicle 300b, according to an embodiment of the disclosure. FIG. 2 is described with reference to the description of FIG. 1.

For example, the vehicle 300a, 300b is a truck, a bus, a trailer and/or a multi-unit vehicle. The vehicle 300a, 300b is located in an environment 310 of the vehicle 300a, 300b. An ambient temperature TS prevails in the environment 310. The vehicle 300a, 300b has a mass W. The vehicle 300a, 300b is traveling at a speed V through the environment 310 of the vehicle 300a, 300b. There is a drivable section with a down gradient 315 in the environment 310 of the vehicle 300a, 300b.

The vehicle 300a, 300b has a deceleration device 280 or a braking system with a friction braking device 200, a continuous braking device 260 and a regenerative braking device 270. For controlling the friction braking device 200, the continuous braking device 260 and the regenerative braking device 270 and for collecting data, the vehicle 300a, 300b has a controller 250 connected to the friction braking device 200, the continuous braking device 260 and the regenerative braking device 270 respectively.

The friction braking device 200 has a temperature TB of the friction braking device 200. By activating the friction braking device 200, kinetic energy is converted into thermal energy, that is, heat, by reducing the speed V and/or reducing an increase in the speed V. The temperature TB of the friction braking device 200 results from the conversion of kinetic energy into heat and a thermal emission HE per time unit t. The friction braking device 200 provides a continuous braking power P of the friction braking device 200, which can be determined by the controller 250. The friction braking device 200 transmits a wear indicator VI relating to the wear of the friction braking device 200 to the controller 250 or the controller 250 determines the wear indicator VI of the friction braking device 200.

The continuous braking device 260 provides a continuous braking power PR of the continuous braking device 260 and is connected to the controller 250 via a CAN bus, for example, to transmit the continuous braking power PR of the continuous braking device 260 to the controller 250.

The regenerative braking device 270 provides a continuous braking power PN of the regenerative braking device 270 and is connected to the controller 250, for example via the CAN bus, to transmit the continuous braking power PN of the regenerative braking device 270 to the controller 250.

The controller 250 is set up to determine or calculate the thermal emission HE per time unit t taking into account a physical model M for heat transport K. For example, the physical model M is a heuristic model M, which takes into account in particular the heat transport K by convection. For this purpose, inputs to the model M are the mass W, the speed V, the ambient temperature TS and the temperature threshold TT, as described with reference to FIG. 1. The model M determines how much heat related to the friction braking device 200 can be emitted per time unit t, that is, the thermal emission HE of the friction braking device 200 per time unit t. Based on the inputs and the model M, the controller 250 determines the continuous braking power P of the friction braking device 200, the total continuous braking power PT of the deceleration device 280, the target speed VS and the deceleration A, as described with reference to FIG. 1. The continuous braking power P at a steady temperature TB of the friction braking device 200 corresponds to the thermal emission HE of the friction braking device 200 per time unit t.

It is understood that the foregoing description is that of the preferred embodiments of the invention and that various changes and modifications may be made thereto without departing from the spirit and scope of the invention as defined in the appended claims.

REFERENCE SIGNS (PART OF THE DESCRIPTION)

100 Method
110 Determining an ambient temperature
120 Determining a speed
130 Determining a thermal emission per unit time
140 Determining the continuous braking power
150 Outputting the continuous braking power
160 Determining a total continuous braking power

9

170 Determining a deceleration
175 Outputting the deceleration
180 Determining a target speed
185 Outputting a target speed
200 Friction braking device
250 Control unit
260 Continuous braking device
270 Regenerative braking device
280 Deceleration device
300a Vehicle
300b Commercial vehicle
310 Environment
315 Down gradient
A Deceleration
D Continuously generatable braking torque
HE Thermal emission
K Heat transport
M Model
t Time unit
TB Temperature of the friction braking device
TS Ambient temperature
TT Temperature threshold
P Continuous braking power of the friction braking device
PR Continuous braking power of the continuous braking device
PN Continuous braking power of the regenerative braking device
PT Total continuous braking power
V Speed
VI Wear indicator
VS Target speed
W Mass

The invention claimed is:

1. A method for determining a continuous braking power for a vehicle, the method comprising:
   determining an ambient temperature;
   determining a speed, wherein the speed is representative of a vehicle speed of the vehicle;
   determining a thermal emission per unit time of a friction braking device on a basis of the ambient temperature and the speed; and,
   determining the continuous braking power of the friction braking device on a basis of the thermal emission per unit time.

2. The method of claim 1, wherein said determining the thermal emission per unit of time is carried out taking into account a physical model for heat transport.

3. The method of claim 1 further comprising outputting the continuous braking power of the friction braking device.

4. The method of claim 3 further comprising determining a total continuous braking power on a basis of the continuous braking power of the friction braking device and at least one of a continuous braking power of a continuous braking device and a continuous braking power of a regenerative braking device.

5. The method of claim 1, wherein said determining the thermal emission per unit time is carried out taking into account at least one of a temperature threshold and a wear indicator.

6. The method of claim 5, wherein said determining the thermal emission per unit time is carried out taking into account the temperature threshold; and, the temperature threshold is an upper limit of a temperature of the friction braking device.

7. The method of claim 5, wherein said determining the thermal emission per unit time is carried out taking into account the temperature threshold; and, the temperature threshold is configured to be changeable during operation of the vehicle.

8. The method of claim 5, wherein said determining the thermal emission per unit time is carried out taking into account the temperature threshold; and, the temperature threshold depends on at least one of a mass of the vehicle and a predetermined scenario.

9. The method of claim 1 further comprising at least one of:
   determining and outputting a deceleration as a function of the continuous braking power of the friction braking device; and,
   determining and outputting a continuously generatable braking torque as a function of the continuous braking power of the friction braking device.

10. The method of claim 1 further comprising:
    determining a target speed based on the continuous braking power and a predetermined down gradient; and,
    outputting the target speed.

11. The method of claim 10, wherein the target speed is determined taking into account at least one of a continuous braking power of a continuous braking device and a continuous braking power of a regenerative braking device.

12. The method of claim 1, wherein the vehicle is a commercial vehicle.

13. A computer program configured, when executed by a computer, to cause the computer to carry out the method of claim 1.

14. A computer-readable medium having commands stored thereon, wherein the commands, when executed by a computer, cause the computer to carry out the method of claim 1.

15. A controller for a vehicle comprising:
    a processor;
    a non-transitory computer readable medium having program code stored thereon;
    said program code being configured, when executed by said processor, to:
    determine an ambient temperature;
    determine a speed, wherein the speed is representative of a vehicle speed of the vehicle;
    determine a thermal emission per unit time of a friction braking device on a basis of the ambient temperature and the speed; and,
    determine a continuous braking power of the friction braking device on a basis of the thermal emission per unit time.

16. The controller of claim 15, wherein the vehicle is a commercial vehicle.

17. A vehicle comprising:
    a controller having a processor and a non-transitory computer readable medium having program code stored thereon;
    said program code being configured, when executed by said processor, to:
    determine an ambient temperature;
    determine a speed, wherein the speed is representative of a vehicle speed of the vehicle;
    determine a thermal emission per unit time of a friction braking device on a basis of the ambient temperature and the speed; and,
    determine a continuous braking power of the friction braking device on a basis of the thermal emission per unit time.

18. The vehicle of claim 17, wherein the vehicle is a commercial vehicle.

* * * * *